United States Patent

Kamath et al.

(10) Patent No.: US 10,402,446 B2
(45) Date of Patent: Sep. 3, 2019

(54) IMAGE ENTITY RECOGNITION AND RESPONSE

(71) Applicants: MICROSOFT TECHNOLOGY LICENSING, LLC, Redmond, WA (US); Udyavara Srikanth Kamath, Redmond, WA (US); Minghua Zhang, Mill Creek, WA (US); Ming Wu, Bellevue, WA (US); Ankush Bindlish, Bellevue, WA (US)

(72) Inventors: Udyavara Srikanth Kamath, Redmond, WA (US); Minghua Zhang, Mill Creek, WA (US); Ming Wu, Bellevue, WA (US); Ankush Bindlish, Bellevue, WA (US)

(73) Assignee: Microsoft Licensing Technology, LLC, Redmond, WA (US)

( * ) Notice: Subject to any disclaimer, the term of this patent is extended or adjusted under 35 U.S.C. 154(b) by 595 days.

(21) Appl. No.: 14/700,027

(22) Filed: Apr. 29, 2015

(65) Prior Publication Data

US 2016/0321300 A1 Nov. 3, 2016

(51) Int. Cl.
*G06F 16/583* (2019.01)
*G06F 16/532* (2019.01)
(Continued)

(52) U.S. Cl.
CPC .......... *G06F 16/583* (2019.01); *G06F 16/532* (2019.01); *G06F 16/58* (2019.01); *G06K 9/6215* (2013.01); *G06K 9/6218* (2013.01)

(58) Field of Classification Search
CPC ......... G06F 17/30265; G06F 17/30277; G06F 17/30247; G06F 16/58; G06F 16/583; G06F 16/532; G06K 9/6215; G06K 9/6218
(Continued)

(56) References Cited

U.S. PATENT DOCUMENTS 7,340,458 B2 * 3/2008 Vaithilingam .... G06F 17/30038
7,565,139 B2    7/2009 Neven et al.
(Continued)

FOREIGN PATENT DOCUMENTS

WO    2015035477 A1    3/2015

OTHER PUBLICATIONS

Lewis, Paul H., et al., "An Integrated Content and Metadata Based Retrieval System for Art", IEEE Transactions on Image Processing, vol. 13, No. 3, Mar. 2004, pp. 302-313.*
(Continued)

*Primary Examiner* — Robert Stevens
(74) *Attorney, Agent, or Firm* — International IP Law Group, PLLC

(57) ABSTRACT

Systems and methods for responding to an image query from a computer user are provided. According to the disclosed subject matter, in response to receiving an image query, a search engine identifies the subject matter of the query image according to similar images. An entity name is determined from the similar images and is mapped to a known entity of the search engine. Based on the known entity, related information regarding the known entity is obtained and one or more search results pages directed to the known entity are generated. At least one of the generated search results pages is returned to the computer user as a response to the image query.

19 Claims, 5 Drawing Sheets

(51) Int. Cl.
*G06K 9/62* (2006.01)
*G06F 16/58* (2019.01)

(58) Field of Classification Search
USPC .......................................................... 707/769
See application file for complete search history.

(56) References Cited

U.S. PATENT DOCUMENTS

| | | | |
|---|---|---|---|
| 8,165,406 B2 | 4/2012 | Tan et al. | |
| 8,296,280 B2 | 10/2012 | Mo | |
| 8,385,589 B2 | 2/2013 | Erol et al. | |
| 8,433,140 B2* | 4/2013 | Ke | G06K 9/6202 382/209 |
| 8,494,983 B2 | 7/2013 | Wang et al. | |
| 9,002,831 B1* | 4/2015 | O'Malley | G06F 17/30864 707/723 |
| 9,053,115 B1* | 6/2015 | Rosenberg | G06F 17/30247 |
| 9,396,413 B2* | 7/2016 | Zhang | G06K 9/74 |
| 2008/0285860 A1 | 11/2008 | Datta et al. | |
| 2010/0046842 A1 | 2/2010 | Conwell | |
| 2011/0188713 A1* | 8/2011 | Chin | G06F 17/30247 382/118 |
| 2012/0183206 A1* | 7/2012 | Tan | G06F 17/30247 382/159 |
| 2012/0233143 A1 | 9/2012 | Everingham | |
| 2013/0054562 A1 | 2/2013 | Bennett | |
| 2013/0325600 A1 | 12/2013 | Everingham et al. | |
| 2014/0105489 A1* | 4/2014 | Chittar | G06F 17/3025 382/162 |
| 2014/0149376 A1 | 5/2014 | Kutaragi et al. | |
| 2014/0337176 A1* | 11/2014 | Ruvini | G06Q 30/0625 705/26.62 |
| 2015/0016699 A1* | 1/2015 | Ritt | G06K 9/6262 382/128 |
| 2015/0169645 A1* | 6/2015 | Li | G06F 17/30277 707/722 |
| 2015/0169952 A1* | 6/2015 | O'Malley | G06F 17/30244 382/225 |
| 2015/0170333 A1* | 6/2015 | Jing | G06T 3/40 345/660 |
| 2015/0220615 A1* | 8/2015 | Wexler | G06F 17/30598 707/740 |

OTHER PUBLICATIONS

Brin, Sergey, et al., "The anatomy of a large-scale hypertextual Web search engine", Computer Networks and ISDN Systems, vol. 30, Issues 1-7, Apr. 1998, pp. 107-117.*
Microsoft Computer Dictionary, 5th Edition, Microsoft Press, Redmond, WA, © 2002, p. 469.*
"Second Written Opinion Issued in PCT Application No. PCT/US2016/029407", dated Mar. 16, 2017, 6 Pages.
"International Preliminary Report on Patentability Issued in PCT Application No. PCT/US2016/029407", dated Aug. 10, 2017, 7 Pages.
Lin, Chin-Yew, "Automatic Question Generation from Queries", In Workshop on the Question Generation Shared Task, Sep. 25, 2008, 2 pages.
Ipeirotis, et al., "Quizz: Targeted Crowdsourcing with a Billion (Potential) Users", In Proceedings of the 23rd International Conference on World Wide Web, Apr. 7, 2014, pp. 143-153.
Yan, et al., "CrowdSearch: Exploiting Crowds for Accurate Real-time Image Search on Mobile Phones", In Proceedings of the 8th international conference on Mobile systems, applications, and services, Jun. 15, 2010, 14 pages.
Bulut, et al., "Crowdsourcing Location-based Queries", In Proceedings of Second IEEE Workshop on Pervasive Collaboration and Social Networking, Mar. 21, 2011, 6 pages.
"International Search Report and Written Opinion Issued in PCT Application No. PCT/US2016/029407", dated Jul. 29, 2016, 11 Pages.
Yeh, et al., "Searching the Web with Mobile Images for Location Recognition", In IEEE Computer Society Conference on Computer Vision and Pattern Recognition, vol. 2, Jun. 27, 2004, pp. 76-81.
Chevallet, et al., "Object Identification and Retrieval From Efficient Image Matching. Snap2Tell with the STOIC Dataset", In Journal of Information Processing and Management: An International Journal—Special Issue: AIRS2005: Information Retrieval Research in Asia, vol. 43, Issue 2, Oct. 29, 2006, pp. 515-530.
Jones, et al., "Automated Annotation of Landmark Images Using Community Contributed Datasets and Web Resources", In Proceedings of 5th International Conference on Semantic and Digital Media Technologies, Dec. 31, 2010, pp. 111-126.

* cited by examiner

IMAGE ENTITY RECOGNITION AND RESPONSE

BACKGROUND

People increasing rely on search engines to answer a wide variety of questions about various items or entities. Search engines, in turn, often rely on structured data from sources such as Wikipedia as primary sources of information for answering questions regarding a given entity. For example, Wikipedia contains structured data for each state within the United States, and this structure includes the state capital, its population, when it was admitted to the Union, official state items (e.g., state tree, state flower, state motto, state flag, etc.), and the like. However, this information typically comprises only a small fraction of the entire set of facts available on any topic. On the other hand, a search engine may have references to a number of web sites (also called web pages) that the search engine deems as including information about a given topic.

Image search is a particular form of a general search query and is supported by a variety of search engines. For an image search, a person/computer user submits an image as an image query to a search engine and, in response, receives a set of related and/or similar images to that which the user submitted. Typically, the images presented to the user in a search results page are thumbnail images, each associated via an embedded hyperlink to the corresponding image that the user traverses to view the corresponding image. Of course, any given image may reside on a web page that includes other information (e.g., captions, titles, descriptions, and the like) and, with enough sleuthing and effort, the person might be able to determine information regarding the subject matter of the submitted image. In short, even after receiving a set of related or similar images, it is still up to the person to discover what exactly the subject matter of a submitted image might be.

SUMMARY

The following Summary is provided to introduce a selection of concepts in a simplified form that are further described below in the Detailed Description. The Summary is not intended to be used to limit the scope of the claimed subject matter.

According to aspects of the disclosed subject matter, systems and methods for responding to an image query from a computer user are provided. According to the disclosed subject matter, in response to receiving an image query, a search engine identifies the subject matter of the query image according to similar images. An entity name is determined from the similar images and is mapped to a known entity of the search engine. Based on the known entity, related information regarding the known entity is obtained and one or more search results pages directed to the known entity are generated. At least one of the generated search results pages is returned to the computer user as a response to the image query.

According to additional aspects of the disclosed subject matter, a method for responding to an image query from a computer user is presented. Upon receiving an image query from a computer user, a set of images is identified. This set of images comprises images that are viewed as being similar to a query image that is included in the image query. Similar image metadata is obtained from at least some of the images of the set of similar images and an analysis is conducted of the similar image metadata to determine a most-likely entity name for the subject matter of the query image. The most-likely entity name is associated with a known entity to the search engine. The search engine then obtains additional information regarding the known entity and generates one or more search results pages according to the obtained information regarding the known entity. At least one search results page of the one or more generated search results pages is returned to the computer user in response to the image query.

According to still further aspects of the disclosed subject matter, a computer-readable medium bearing computer-executable instructions configured to carry out a method for responding to an image query from a computer user is presented. In execution, the method first receives an image query, where the image query includes a query image corresponding to the subject matter for which additional information is sought. A set of images is identified, the set of images comprising similar images that are determined to be similar to the query image by the search engine. An analysis of the images of the set of images is conducted to determine a most-likely entity name for the subject matter of the query image and the most-likely entity name is associated with or correlated to a known entity to the search engine. Additional information regarding the known entity is obtained and one or more search results pages are generated according to the obtained information regarding the known entity. At least one search results page is returned to the computer user in response to the image query.

According to still further aspects of the disclosed subject matter, a computer system providing the services of a search engine for responding to an image query from a computer user is presented. In addition to a processor and a memory, the computer system comprises a similar images identification component that is configured to identify a set of images that are determined to be similar to the query image when an image query is received. Also included is an entity name identifier component that is configured to determine a most-likely name for the subject matter of the query image according to the set of images identified by the similar images identification component. An entity match component matches the most-likely name for the subject matter of the image query to a known entity of the search engine and a search results retrieval component obtains information regarding the known entity from a content store associated with the search engine. Based on the information regarding the known entity, a search results page generator generates one or more search results pages and at least some images of the set of images, and provides at least one generated search results page to the computer user in response to the search query.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity, the term "exemplary," as used in this document, should be interpreted as serving as an illustration or example of something, and it should not be interpreted as an ideal and/or a leading illustration of that thing. The term "entity" corresponds to a particular, specific item or thing, or an instance of an item/thing. An entity may correspond to a particular person, a group of people, a concept, and the like. Correspondingly, a "known entity" corresponds to a particular, specific item or thing, or an instance of an item/thing, which is known and identified by the search engine. For example, an entity may be a particular breed of dog, whereas a known entity may be a particular breed of dog as known and identified by the search engine.

For purposes of this document, an image query corresponds to a set of content submitted to a search engine with the expectation of receiving, in response, information related to the submitted content. The image query contains at least a submitted image for which additional information is sought from the search engine. In accordance with aspects of the disclosed subject matter, the additional information may include information regarding a known entity identified from information associated with related and/or similar images identified by the search engine as part of its process to respond to the image query.

For purposes of this documents, a "thumbnail image" refers to a reduced-size version of a source image. A thumbnail image (or also referred to simply as a thumbnail) is also frequently of a lower resolution that the source image. Frequently, thumbnail images are embedded as part of a hyperlink to the source image, such that interaction with the thumbnail image will often cause the displaying application to retrieve (or navigate to) and display the source image.

Figure 1:
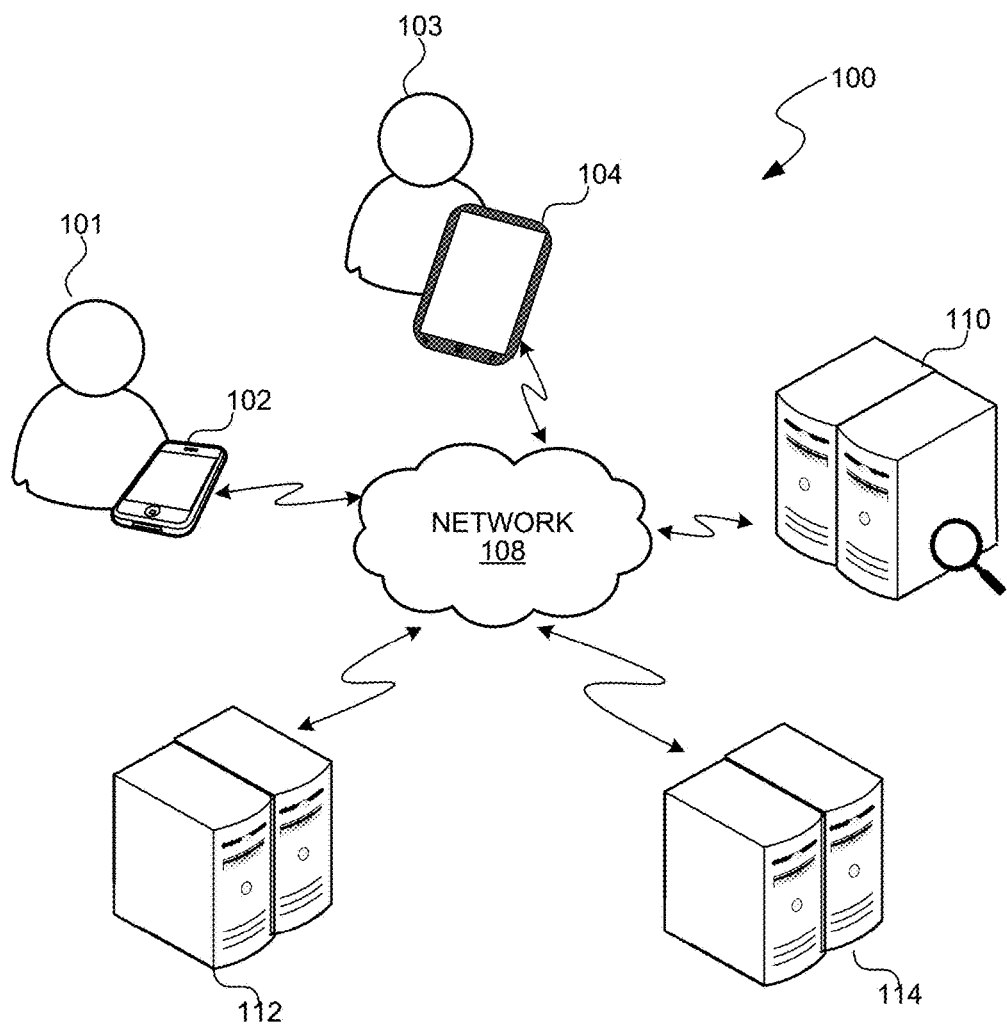
FIG. 1 is a block diagram illustrating an exemplary network environment suitable for implementing aspects of the disclosed subject matter, including receiving an image query, identifying a known entity corresponding to the image of the image query, and responding with search results regarding the known entity.

Turning now to FIG. 1, FIG. 1 is a block diagram illustrating an exemplary network environment 100 suitable for implementing aspects of the disclosed subject matter, including receiving an image query, identifying a known entity corresponding to the image of the image query, and responding with search results regarding the known entity. The exemplary network environment 100 includes a network 108 over which various computer users, such as computer users 101 and 103, may submit image queries to a suitably configured search engine 110. Without limitation and by way of illustration, the network 108 may correspond to a wide area network such as the Internet. The computer users 101 and 103 submit their image queries to the search engine 110 by way of computing devices, such as computing devices 102 and 104. Also connected to the network 108 are various other network accessible sites and/or services, including network sites 112 and 114. As will be readily appreciated, these network accessible sites may host or provide content, including source images and related information. The content and related information hosted on the various network sites is captured by the search engine, often through a process referred to as "crawling" which systematically browses the network sites for the purpose identifying/capturing content for indexing in a content index that the search engine maintains.

Figure 2:
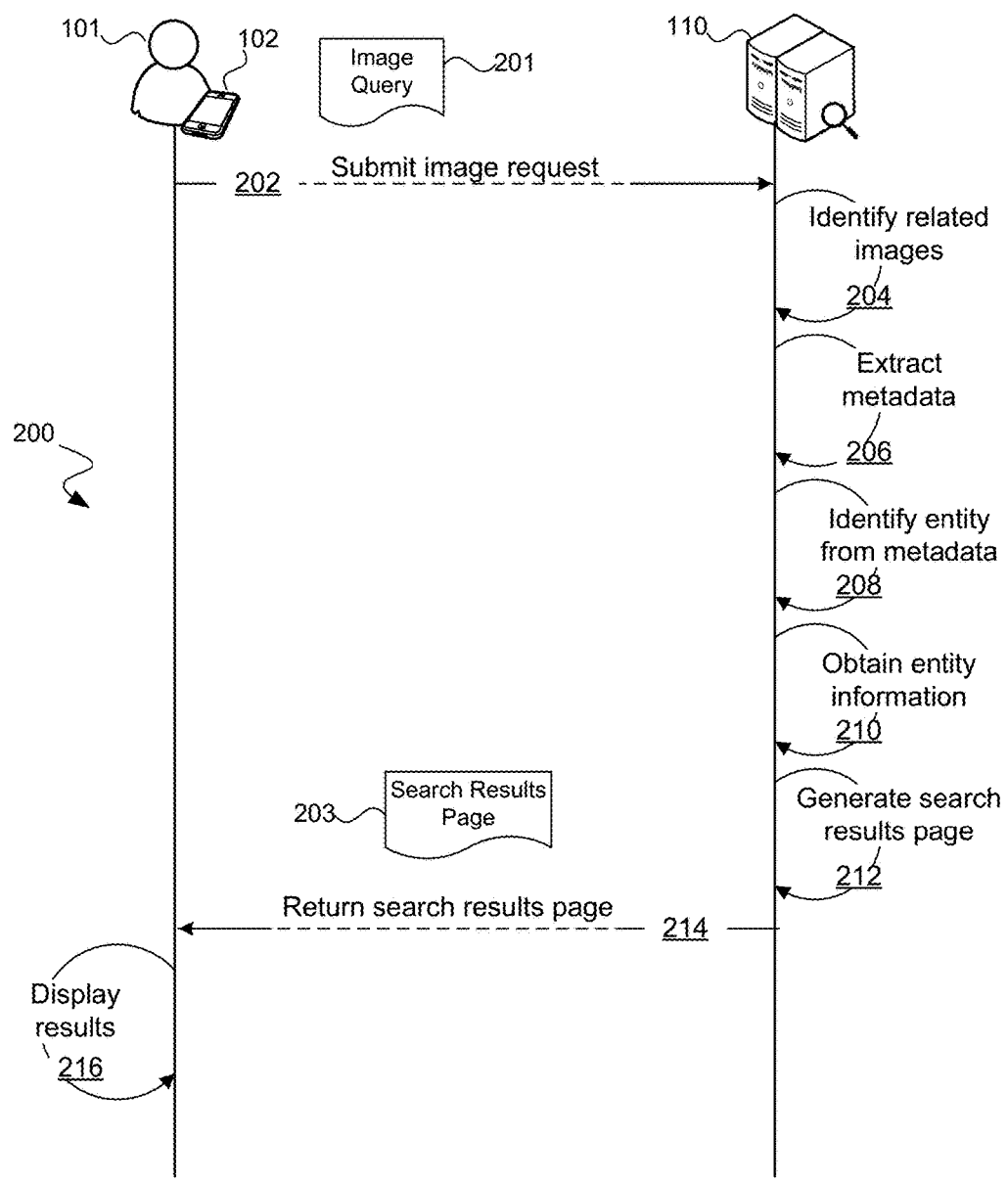
FIG. 2 is a block diagram illustrating an exemplary process flow with regard to a computer user submitting an image query to a search engine and, in response, receiving search results regarding a known entity of the subject matter of the image query.

To illustrate elements of the disclosed subject matter, reference is now made to FIG. 2. FIG. 2 is a block diagram illustrating an exemplary process flow 200 with regard to a computer user, such as computer user 101, submitting an image query 201 to a search engine 110 and, in response, receiving a search results page 203 regarding a known entity of the subject matter of the image query. Moreover, in discussing FIG. 2, reference is also made to FIG. 3, which is a pictorial diagram 300 illustrating exemplary search results, such as search results page 203, of the process flow 200 of FIG. 2. To initiate the process, the computer user 101 will generate an image query 201 that is comprises of at least a query image 301 (i.e., the image of the image query 201). Of course, without limitation, generating an image query 201 may comprise nothing more than identifying the query image 301 that is to be submitted to the search engine 110.

As indicated in the exemplary process flow 200, the image query 201 is submitted to the search engine 110, as indicated by arrow 202. Upon receipt, the search engine recognizes that this is an image query from the computer user 101 according to the submitted content/query and, as indicated by arrow 204, identifies a set of similar images that the search engine 110 determines to be similar to the query image 301. The set of similar images are identified from a corpus of images of which the search engine is aware. Typically, the information that the search engine 110 maintains references to the known images which are hosted on various network sites on the network 108, such as network sites 112 and 114. In addition to a reference to a known image, a search engine may also maintain attribute information regarding the various images such that selecting the images of the set of similar images may be conducted efficiently, including minimizing access to the source image hosted on an external web site.

Once the query image is obtained, task completion illustratively includes the following steps. First, a feature vector is generated for the query image. The feature vector may be generated according to a plurality of qualitative and quantitative aspects of the query image including, by way of illustration and not limitation, colors, shades, shapes and sizes. This feature vector corresponding to the query image is then provided to a machine learning model which searches for and locates the set of similar images. According to aspects of the disclosed subject matter, the machine learning model may be implemented according to any number of suitable algorithms including support vector machine (SVM) and/or logistic regression. Further still, the learning module may also be configured to leverage the image retrieval APIs of any number of existing search engines in identifying the related images.

From this set of similar images, the search engine extracts similar image metadata, as indicated by arrow 206. Similar image metadata may correspond to a title associated with an image, a caption of the image (i.e., a brief description and/or explanation associated with the image, closely associated with the image and often included within the same structured language element in which the image is identified for display), descriptive content of the image (i.e., content on the same web page as is the image that relates to, describes, and/or explains the subject matter of the image), and the like. The similar image metadata of each image may be stored and maintained by the search engine 110 in the corpus of images, may be obtained on an as-needed basis from the host web site of the similar image(s), or a combination of the two.

After having extracted the similar image metadata for the set of similar images, an analysis is performed on the similar image metadata to identify a likely entity name (or names) for the content of the query image 301, as indicated by arrow 208. According to various aspects of the disclosed subject matter, an analysis module, such as a machine-learning module, may be utilized to analyze the similar image metadata to determine a most-likely entity name of the similar images. This analysis may include clustering techniques using Jaccard similarity, Levenshtein distance, TF-IDF (term frequency/inverse document frequency), as well as normalizing terms used in the similar image metadata, and the like. By way of further illustration, alternatively or additionally, for each of the identified related images, the analysis is performed with regard to the annotations of the identified related images. In one non-limiting example, a simple n-gram frequency approach to identify and/or extract the most relevant entities/phrases is conducted on the annotations. Of course, an n-gram frequency approach can be replaced by any one or more of alternative algorithms in order to maximize term (name) extraction of the identified related images. The result, as indicated above, is the most-likely entity name (or a set of the most-likely entity names) for the query image 301.

After having identified the most-likely entity name (or names) of the query image 301, this information is then used to select a known entity from a corpus of known entities maintained by the search engine 110. By way of definition, a known entity is a specific, unique entity known to the search engine 110. Typically, a known entity is associated with a unique entity identifier by the search engine. A known entity may be, by way of illustration and not limitation, a specific person (e.g., Barack Obama though celebrity or fame is not a controlling factor), a unique thing (e.g., the Eiffel Tower, the Hope diamond, etc.), a location (e.g., Niagara Falls), and the like. Additionally, a known entity may correspond to a specific class or category that references multiple items or things. Non-limiting examples include dinosaurs, presidents of the United States, a religion, and the like. As shown in the search results page 203 of FIG. 3, the known entity corresponds to a "Sego Lily," as indicated by the result tab 302, which is a type of flower indigenous to the western United States.

After identifying the known entity from the similar image metadata, entity information regarding the known entity is obtained by the search engine 110, as indicated by arrow 210. This information may include structured textual content regarding the known entity, images of the known entity, hyperlinks to web sites that host content regarding the known entity, and the like. Indeed, at this point in the process, obtaining entity information regarding the known entity of the query image 301 is very similar to obtaining search results information corresponding to the known entity. In this, the search engine 110 identifies the various sources of information regarding the known entity (according to information in a content store maintained by the search engine) and obtains the information.

Based on the obtained entity information regarding the known entity, the search engine generates at least one search results page (as indicated by arrow 212) and returns the generated search results page 203 to the computer user 101 via the computer user's computing device 102, as indicated by arrow 214. As will be readily appreciated, upon receipt of the search results page 203, the results are displayed to the computer user 101 on the computing device 102, as indicated by arrow 216.

While the process 200 described above is made in regard to identifying a single entity from the similar image metadata, it should be appreciated that this is illustrative and not limiting upon the disclosed subject matter. In various instances, multiple entities may be identified from the similar images. These multiple entities may indicate that the query image includes multiple subjects (i.e., Barack Obama and Vladimir Putin), or simply that the set of similar images is based on something other than the entity (or entities) within the images. In some embodiments, when multiple entities are identified, information regarding each identified entity is processed (e.g., multiple tabs on a search results page for each entity.). Alternatively, the analysis may choose between the identified entities according to various heuristics for determining which entity is the most likely entity sought by the image query 201.

Figure 4:
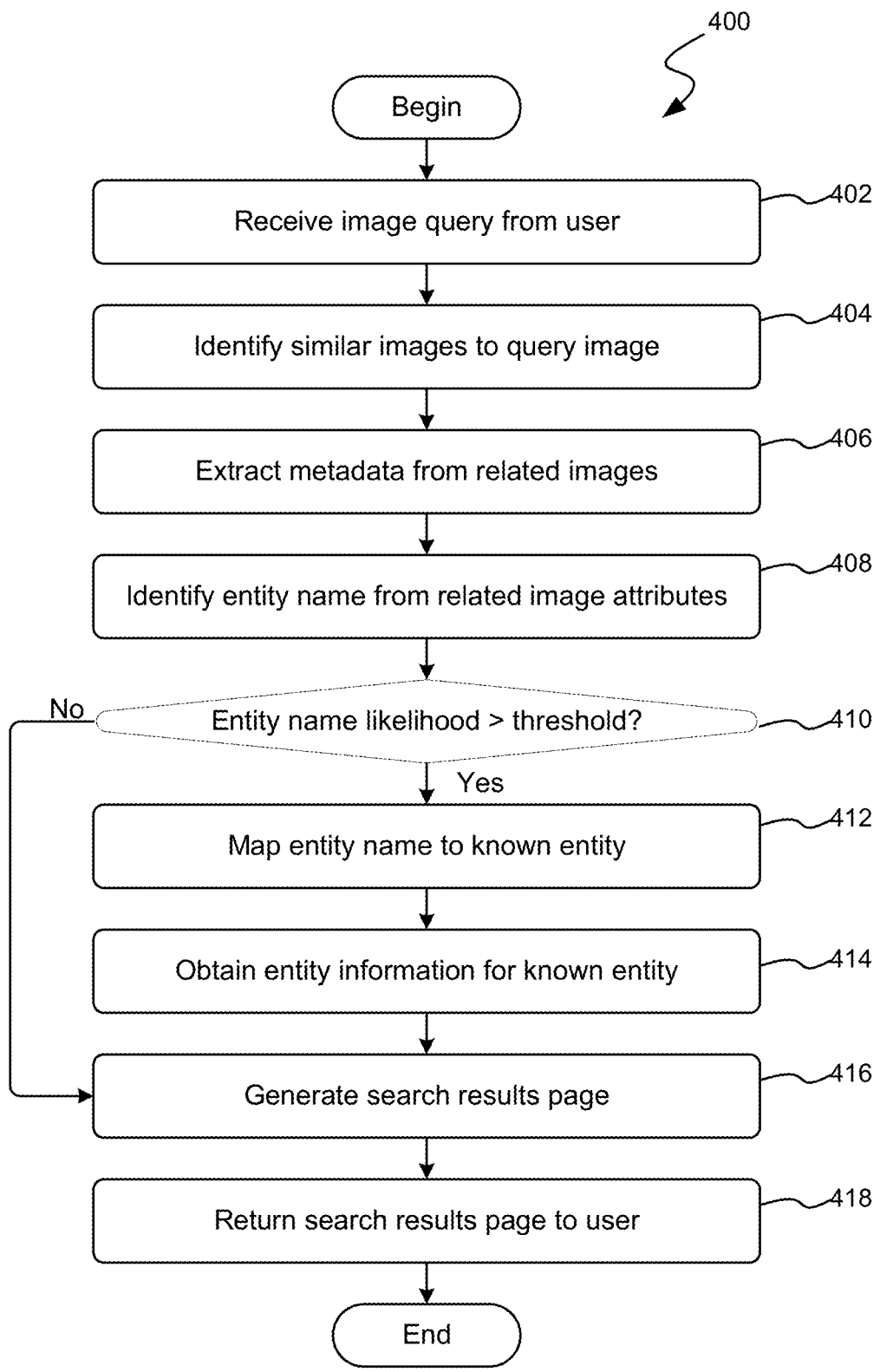
FIG. 4 is a flow diagram illustrating an exemplary routine for responding to an image query according to various aspects of the disclosed subject matter.

Turning now to FIG. 4, FIG. 4 is a flow diagram illustrating an exemplary routine as implemented on a search engine 110 for responding to an image query, such as image query 201 of FIG. 2, according to various aspects of the disclosed subject matter. Beginning at block 402, the search engine 110 receives an image query 201 from the computer user 101. At block 404, the search engine 110 identifies a set of similar images to the query image from a corpus of images. At block 406, metadata regarding the similar images is extracted/obtained.

As discussed above in regard to block 208 of FIG. 2, at block 408 an analysis is performed on the similar images metadata to identify a likely (typically the most-likely) entity name for the similar images (and, corresponding, for the query image 301.) As previously indicated, this analysis may include, by way of illustration and not limitation, any or all of clustering techniques using Jaccard similarity, Levenshtein distance, TF-IDF (term frequency/inverse document frequency), term normalization, and the like.

According to various aspects of the disclosed subject matter, the entity name (or entity names) may be associated with a value indicating the likelihood that the entity name is the correct entity name for the related images. This value is assigned in the analysis of the similar entity metadata to each of the entity names that are generated. Thus, at decision block 410, a determination may be optionally made with regard to whether or not the entity name identified by the analysis for the query image 301 meets or exceeds a predetermined threshold.

As illustrated in FIG. 4, if the likelihood value associated with the most-likely entity name exceeds a predetermined threshold, then at block 412 the entity name is matched to a known entity of the search engine 110. Thereafter, at block 414, entity information regarding the known entity is obtained. As mentioned above, this entity information may include structured textual content regarding the known entity, images of the known entity, hyperlinks to web sites that host content regarding the known entity, and the like.

In the alternative, if the likelihood value associated with the most-likely entity name does not exceed the predetermined threshold, then the routine 400 proceeds to block 416. At block 416, if the if the likelihood value associated with the most-likely entity name does not exceed the predetermined threshold, search engine generates one or more search results from the related images in response to the image query 201. However, if the likelihood value associated with the most-likely entity name meets or exceeds the predetermined threshold, then the search engine generates one or more search results from the obtained known entity information (obtained in block 414). Of course, as indicated in FIG. 3, where the likelihood value associated with the most-likely entity name meets or exceeds the predetermined threshold, search results page may be generated to also include the set of similar images (such as by clicking on a user-control 304 to display the images to which the computer user may refer as desired.

Figure 3:
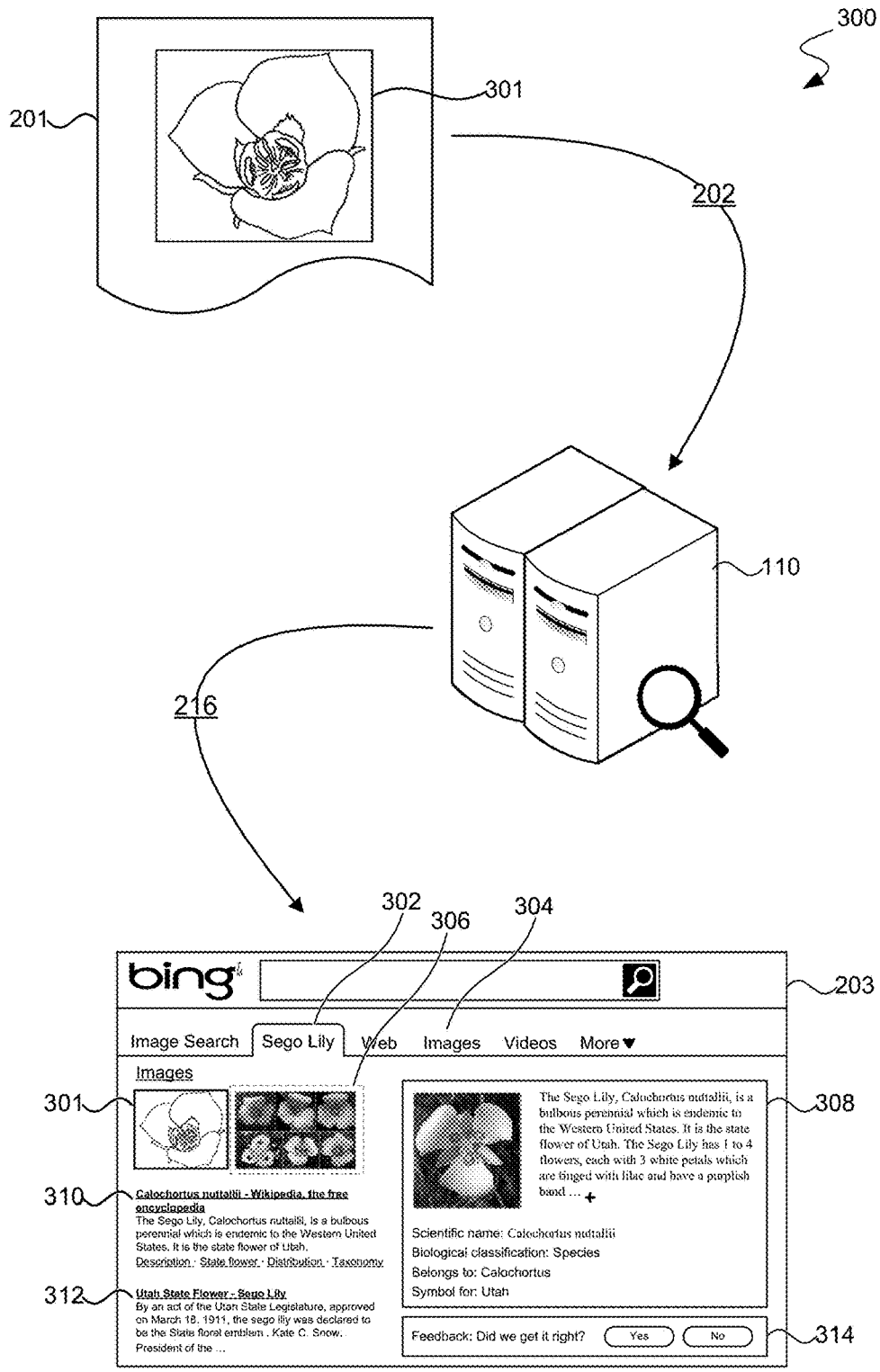
FIG. 3 is a pictorial diagram illustrating exemplary search results of the process flow of FIG. 2.

By way of illustration and not limitation and with reference to FIG. 3, a generated search results page 203 may include the image 301 that the computer user submitted, an entity card 308 that includes various items of descriptive and informative data regarding the known entity, search results 310 312 referencing additional content regarding the known entity, controls for viewing other information regarding the known entity (such as control 304 for displaying images of the known entity), and the like. Moreover, according to various aspects of the disclosed subject matter, since the identification of the known entity is based on a likelihood/probability of identifying the entity name from the similar images metadata, a feedback region 314 may also be included by which the computer user can verify that the provided information is accurate or not.

After generating one or more search results pages in response to the image query 201, the search engine returns at least one search results page 201 to the computer user in response to the image query, as indicated in block 418. Thereafter, the routine 400 terminates.

In addition to the steps of the above-described routine 400, additional processing may occur after the search results are returned to the computer user in response to the image query. This additional processing may include, by way of illustration and not limitation, the handling of explicit and implicit user feedback. Explicit user feedback corresponds to information provided by the computer user in regard to the search results provided by the search engine 110. By way of example of explicit, the feedback region 314 includes two user-actionable controls 316 318 which allow the user to optionally indicate whether the known entity, selected by the search engine as the topic/subject matter for which the image query is directed, was correctly selected by the search engine. In this case, the indication is explicitly identified by the computer user and sent to the search engine. Upon receipt of this (and of implicit feedback), the machine learning process for identifying a most-likely entity name may be updated for future processing/selection.

In regard to implicit user feedback, the browser that displays the returned search results page(s) and/or code embedded within the generated search results page(s) may track user interaction (or lack of user interaction) with one or more of the elements of the search results page(s) and provide this user interaction back to the search engine. This returned information is provided to the machine learning module that determines the most-likely entity name for future processing/selection considerations. This type of feedback is implicit in that the computer user's intent is directed to interacting (or not interacting) with the content of the search results page(s), and not to providing feedback Regarding routine 400 described above, as well as other processes describe herein such as process 200, while these routines/processes are expressed in regard to discrete steps, these steps should be viewed as being logical in nature and may or may not correspond to any actual and/or discrete steps of a particular implementation. Also, the order in which these steps are presented in the various routines and processes, unless otherwise indicated, should not be construed as the only order in which the steps may be carried out. In some instances, some of these steps may be omitted. Those skilled in the art will recognize that the logical presentation of steps is sufficiently instructive to carry out aspects of the claimed subject matter irrespective of any particular language in which the logical instructions/steps are embodied.

Of course, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Any or all of the steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 5 below. Additionally, in various embodiments all or some of the various routines may also be embodied in executable hardware modules including, but not limited to, system on chips, codecs, specially designed processors and or logic circuits, and the like on a computer system.

These routines/processes are typically embodied within executable code modules comprising routines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar beneficial results.

While many novel aspects of the disclosed subject matter are expressed in routines or processes embodied within applications (also referred to as computer programs), apps (small, generally single or narrow purposed, applications), executable modules and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed, the execution thereof causes, configures and/or adapts the executing computing device to carry out various steps, methods and/or functionality, including those steps, methods, and routines described above. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may deliver the computer-executable instructions (and data) to a computing device for execution via various transmission means and mediums, including carrier waves and/or propagated signals, for purposes of this disclosure computer readable media expressly excludes carrier waves and/or propagated signals.

Advantageously, many of the benefits of the disclosed subject matter can be conducted on a variety of computing devices and configurations. Indeed, computing devices suitable for implementing the disclosed subject matter include, by way of illustration and not limitation: desktop computers; mini- and mainframe computers; distributed, cooperative computing devices; cloud-based computing services; and the like. Indeed, a suitably configured search engine 110 is accessed by third parties, such as computer users 101 and 103, as an online-service and may be implemented on any one or more of a variety of computing devices such as those mentioned above.

Figure 5:
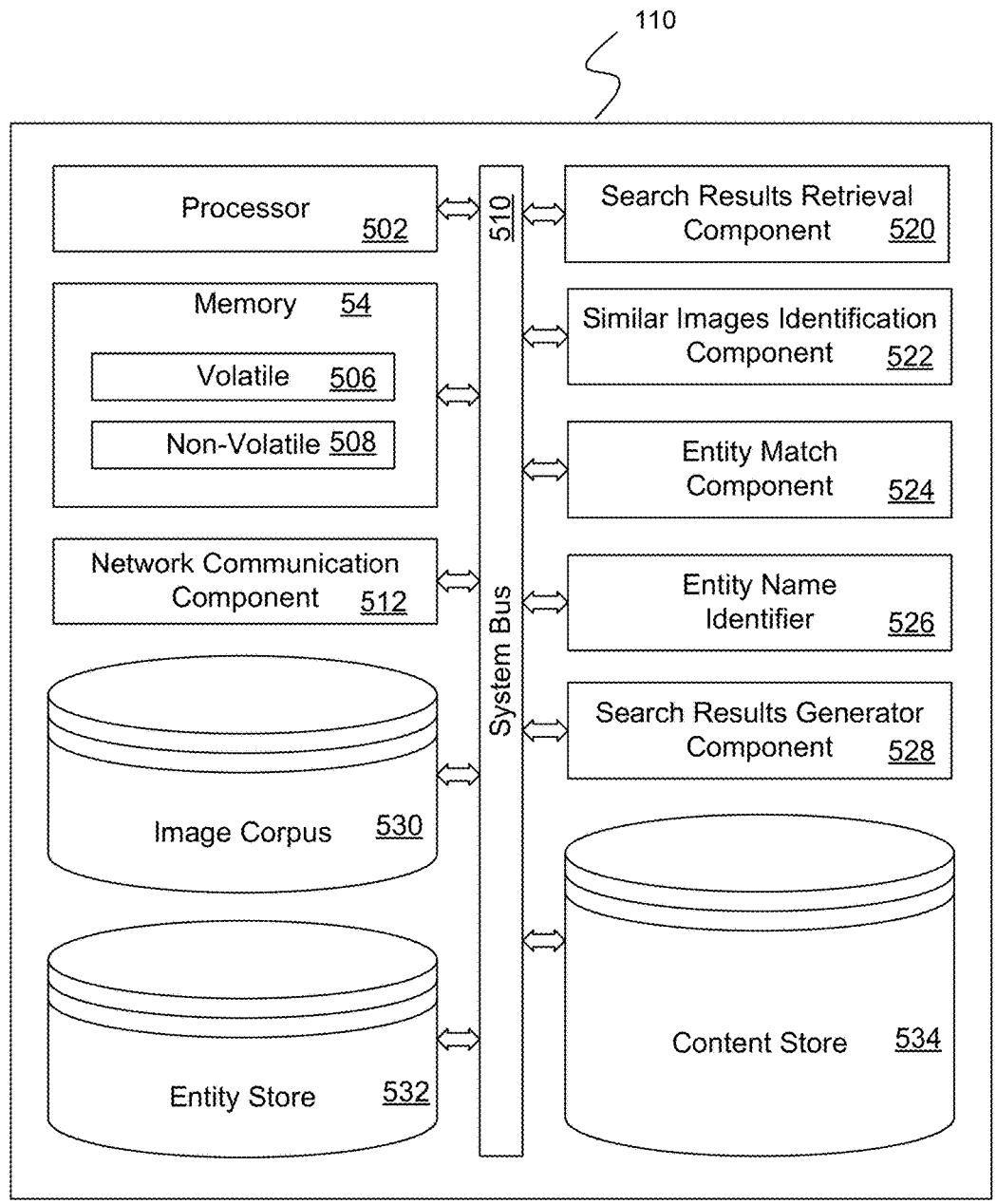
FIG. 5 is a block diagram illustrating exemplary components of a suitably configured search engine, as implemented on a computing device, for responding to an image query with search results regarding the identified subject matter of the image query.

In regard to the implementation of a search engine, FIG. 5 is a block diagram illustrating exemplary components of a suitably configured search engine, as implemented on a computing device, for responding to an image query with search results regarding the identified subject matter of the image query. Of course, while the discussion is made in regard to a single suitably configured computing device, it should be appreciated that this is ease in description and illustration, and should not be viewed as limiting upon the disclosed subject matter. The exemplary search engine 110 includes one or more processors (or processing units), such as processor 502, and a memory 504. The processor 502 and memory 504, as well as other components, are interconnected by way of a system bus 510. The memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 506 whereas ROM, solid-state memory devices, memory storage devices, and/or memory cards are examples of non-volatile memory 508.

The illustrated search engine 110 further includes a network communication component 512 for interconnecting this search engine with other devices over a computer network 108. The network communication component 512, sometimes referred to as a network interface card or NIC, communicates over a network 108 using one or more communication protocols via a physical/tangible (e.g., wired, optical, etc.) connection, a wireless connection, or both. As will be readily appreciated by those skilled in the art, a network communication component, such as network communication component 512, is typically comprised of hardware and/or executable firmware components (and may also include or comprise executable software components) that transmit and receive digital and/or analog signals over a transmission medium.

The processor 502 executes instructions retrieved from the memory 504 (and/or from computer-readable media, as discussed above) in carrying out various functions, particularly in regard to responding to an image query 201 with search results directed to the entity/subject matter of the query image 301. The processor 501 may be comprised of any of a number of available processors such as single-processor, multi-processor, single-core units, and multi-core units.

The exemplary search engine 110 also includes a search results retrieval component 520. The search results retrieval component obtains search results from a content store 534 that the search engine determines to be relevant to a query topic—which may comprise a known entity. In the present example, the search results retrieval component 520 is requested to obtain search results (and related information) regarding a known entity, the search results retrieval component obtains search results, images of the known entity, structured information regarding the known entity, and the like regarding the known entity, which information is used in generating a search results page.

A similar images identification component 522 is configured to identify similar images to a query image 301 from an image corpus 530 that the search engine 110 maintains. As indicated above, the similar images identification component 522 may generate a feature vector corresponding to the query image 301 and use the feature vector, in conjunction with a machine learning model, to identify the set of similar images. Further, the similar images identification component 522 may further rely upon existing image retrieval APIs of various available search engines.

The suitably configured search engine 110 also includes an entity name identifier 526. As indicated above, the entity name identifier 526 obtains similar image metadata of the set of similar images to the query image 301, and determines a most-likely entity name for the entity/subject matter of the image query 201. As indicated above, these determination is made according to an analysis of the similar entity metadata, which analysis may include clustering techniques using Jaccard similarity, Levenshtein distance, TF-IDF (term frequency/inverse document frequency), as well as normalizing terms used in the similar image metadata, and the like. The determinations may be further made according to the annotations of the identified related images. As mentioned above, a simple n-gram frequency approach to identify and/or extract the most relevant entities/phrases may be conducted on the annotations to extract a most-likely entity name.

An entity match component 524 is configured to match a most-likely entity name (as identified by the entity name identifier 526) to a known entity in an entity store 523. A search results generator component 528 is configures to generate one or more search results pages according to the information that is available: if it is determined that the image query is made in regard to a known identity, the search results generator component 528 generates the one or more search results pages with specific regard to the known entity. Alternative, in response to an image query that is not identified as being directed to a known entity, the search results generator component 528 generates the one or more search results pages according to the identified similar images. The search results generator component 528 returns at least one generated search results page to the requesting computer user (such as computer user 101) in response to an image query 201 via the network communication component 512.

Regarding the various components of the exemplary search engine 110, those skilled in the art will appreciate that these components may be implemented as executable software modules stored in the memory of the computing device, as hardware modules and/or components (including SoCs—system on a chip), or a combination of the two. Moreover, in certain embodiments each of the various components may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method operating on a computer and responding to an image query from a computer user, the method comprising:
    receiving an image query, the image query including a query image of subject matter for which additional information is sought;
    generating a feature vector from the query image;
    identifying a set of images based on the feature vector from the query image;
    obtaining image metadata from at least some of the images of the set of images;
    performing clustering techniques by the computer on the image metadata from at least some of the images of the set of images to identify relevant entities and determine an entity name for the subject matter of the query image, wherein an assigned likelihood value that the entity name is correct is above a predetermined threshold;
    using the entity name to select a known entity from a corpus of known entities indexed by the search engine;
    identifying various sources of information regarding the known entity and obtaining additional information regarding the known entity from those various sources;
    generating one or more search results pages according to the obtained additional information regarding the known entity; and
    returning at least one search results page to the computer user.

2. The method of claim 1, wherein the image metadata comprises captions associated with the at least some of the images of the set of images.

3. The method of claim 1, wherein the image metadata comprises titles of associated with the at least some of the images of the set of images.

4. The method of claim 1, wherein the image metadata comprises descriptive content of the at least some of the images of the set of images.

5. The method of claim 1, wherein the image metadata comprises at least two captions associated with the at least some of the images of the set of images, titles of associated with the at least some of the images of the set of images, and descriptive content of the at least some of the images of the set of images.

6. The method of claim 1, further comprising generating one or more search results to include user actionable controls for providing feedback of a computer user regarding whether or not the known entity is the correct known entity for the image query.

7. A computer readable medium bearing computer executable instructions which, in execution on a computing system by a processor, carry out a method responding to an image query from a computer user, the method comprising:
    receiving an image query, the image query including a query image of subject matter for which additional information is sought;
    generating a feature vector from the query image;
    identifying a set of images based on the feature vector from the query image;
    performing clustering techniques by the computer system on the images of the set of images to identify relevant entities and determine an entity name for the subject matter of the query image, wherein an assigned likelihood value that the entity name is correct is above a predetermined threshold;
    using the entity name to select a known entity from a corpus of known entities indexed by the search engine;
    identifying various sources of information regarding the known entity and obtaining additional information regarding the known entity from those various sources;
    generating one or more search results pages according to the obtained additional information regarding the known entity; and
    returning at least one search results page to the computer user.

8. The computer readable media of claim 7, wherein the method further comprises generating one or more search results to include user actionable controls for providing feedback of a computer user indication regarding whether or not the known entity is the correct known entity for the image query.

9. The computer readable media of claim 8, the method further comprising:
    obtaining image metadata from at least some of the images of the set of images; and
    wherein performing clustering techniques to determine the entity name for the subject matter of the query image comprises conducting an analysis of the image metadata to determine a the entity name for the subject matter of the query image.

10. The computer readable media of claim 9, wherein the image metadata comprises captions associated with the at least some of the images of the set of images.

11. The computer readable media of claim 10, wherein the image metadata further comprises titles associated with the at least some of the images of the set of images.

12. The computer readable media of claim 11, wherein the image metadata further comprises descriptive content of the at least some of the images of the set of images.

13. The computer readable media of claim 9, wherein the image metadata comprises at least two captions associated with the at least some of the images of the set of images, titles of associated with the at least some of the images of the set of images, and descriptive content of the at least some of the images of the set of images.

14. A computer system providing the services of a search engine responding to an image query from a computer user, the computer system comprising a processor and a memory, wherein the processor executes instructions stored in the memory as part of or in conjunction with additional components to respond to an image query from the computer user, the image query comprising a query image of subject matter for which information is sought, the additional components comprising:
    a similar images identification component configured to generate a feature vector from a query image and identify a set of images based on the feature vector from the query image;
    an entity name identifier component configured to identify relevant entities and determine an entity name for the subject matter of the query image according to the set of images identified by the similar images identification component, wherein an assigned likelihood value that the entity name is correct is above a predetermined threshold;

an entity match component configured to match the entity name for the subject matter of the image query to a known entity from a corpus of known entities indexed by the search engine;

a search results retrieval component configured to identify various sources of information regarding the known entity and obtain information regarding the known entity from those various sources; and a search results page generator configured to generate one or more search results pages according to the obtained information regarding the known entity and at least some images of the set of images, and provide at least one generated search results page to the computer user.

15. The computing system of claim 14, wherein:

the entity name identifier component obtains image metadata corresponding to the set of images identified by the images identification component; and wherein the entity name identifier component determines an entity name for the subject matter of the query image according to the image metadata corresponding to the set of images identified by the similar images identification component.

16. The computing system of claim 15, wherein the image metadata comprises captions associated with the at least some of the images of the set of images.

17. The computing system of claim 15, wherein the image metadata further comprises titles associated with the at least some of the images of the set of images.

18. The computing system of claim 15, wherein the image metadata comprises at least two captions associated with the at least some of the images of the set of images, titles of associated with the at least some of the images of the set of images, and descriptive content of the at least some of the images of the set of images.

19. The computing system of claim 15, wherein the search results page generator is configured to generate one or more search results to include user actionable controls for providing feedback of a computer user indication regarding whether or not the known entity is the correct known entity for the image query.

* * * * *